March 22, 1966  R. F. LO PRESTI  3,241,655
MOVABLE TROUGHING IDLER ASSEMBLY
Filed Jan. 8, 1963  2 Sheets-Sheet 1
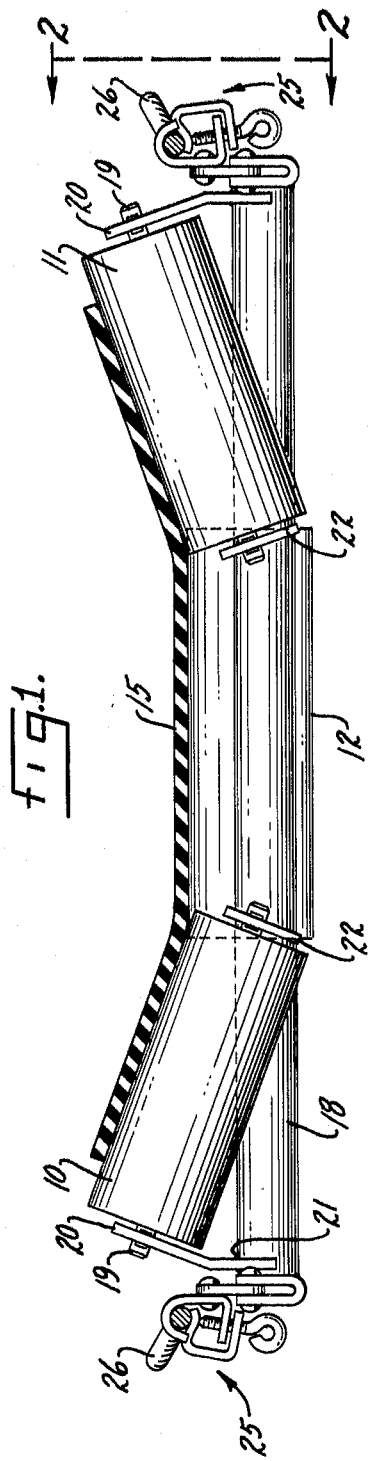
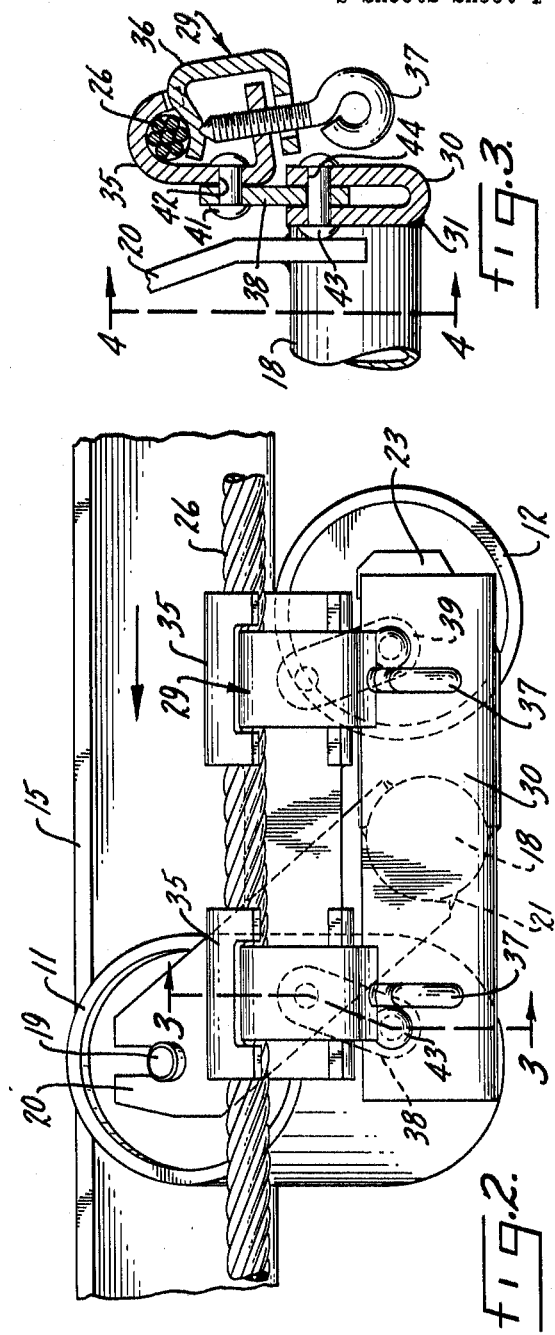
INVENTOR.
Roy F. Lo Presti,
BY Parker & Carter
Attorneys.

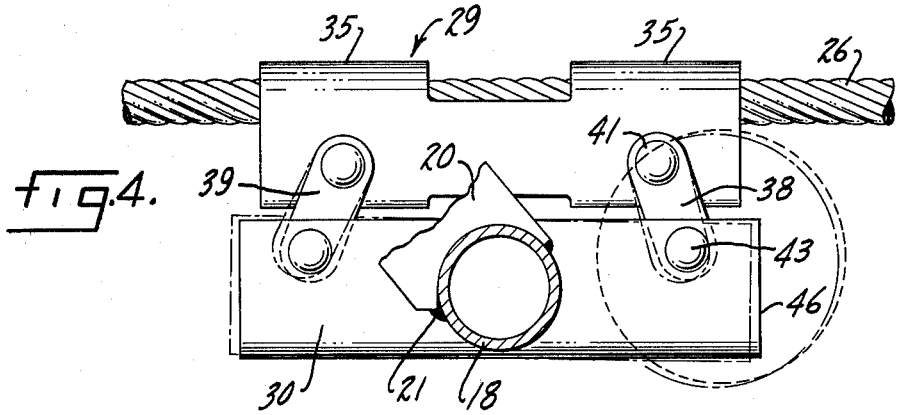
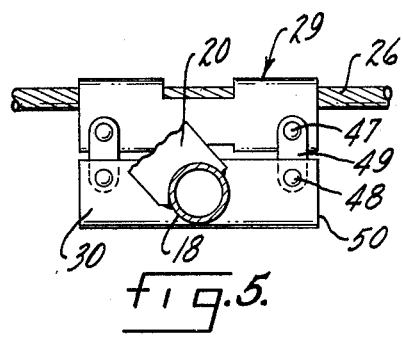
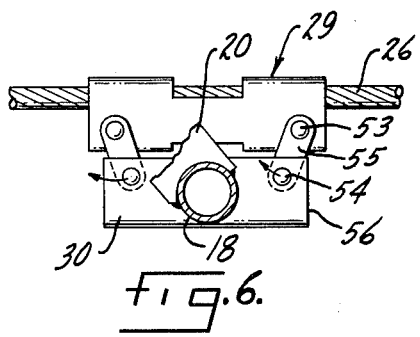

United States Patent Office

3,241,655
Patented Mar. 22, 1966

3,241,655
MOVABLE TROUGHING IDLER ASSEMBLY
Roy F. Lo Presti, Chicago, Ill., assignor to Goodman Manufacturing Company, Chicago, Ill., a corporation of Illinois
Filed Jan. 8, 1963, Ser. No. 250,140
5 Claims. (Cl. 198—192)

This invention relates to impact absorbing troughing idler assemblies for wire rope sideframe conveyors. It particularly relates to troughing idler assemblies which move downstream after receiving an impact from a conveyed load.

The primary object of this invention is a troughing idler assembly movably connected to opposed elongated connectors on spaced wire ropes.

Another object is an elongated connector having a body section which is movable relative to a rope clamp section which engages the wire ropes.

Another object is a rope engaging elongated connector in which a body section is joined by linkage means to a rope clamp section so that the body section can move downstream.

Another object is a troughing idler assembly which is connected to a movable body section of an elongated connector so that the troughing idler assembly movably yields upon receiving an impact.

Another object is a troughing idler assembly mounted on a crossbrace which is fixed at its opposed ends to movable sections of elongated connectors so that the assembly may move downstream upon receiving an impact.

The foregoing objects are realized by this invention along with other objects which will become apparent from reading the specification and the claims. The invention, which will be described in detail, is illustrated in the accompanying drawings wherein:

FIGURE 1 is a front elevational view of a troughing idler assembly,
FIGURE 2 is an end elevational view of the elongated connector joined to a roller of the idler assembly,
FIGURE 3 is a view along line 3—3 of FIGURE 2,
FIGURE 4 is a view along line 4—4 of FIGURE 3 with parts removed,
FIGURE 5 is a view of another embodiment, and
FIGURE 6 is a view of still another embodiment.

Like numerals will be used to refer to like structures, elements and concepts throughout the specification.

In FIGURE 1 is shown a troughing idler assembly with wing rollers 10, 11 and center roller 12. The rollers are shown carrying the conveying reach 15 of an endless belt which is carried by other idler assemblies along the length of a wire rope sideframe conveyor. The conveyor has the well-known spaced wire ropes supported by stands or the like along its length. The endless belt turns around pulleys at opposite ends, and lower return rollers carry the return reach of the belt.

The assembly is mounted on a crossbrace 18. The wing rollers, which are mounted on one side of the crossbrace, have a shaft 19 which is fixed at one end to a generally upright bracket 20 mounted on the crossbrace by welds or the like 21. The other end of the shaft is supported by a bracket 22 which may be similarly secured to the crossbrace and which is shown as extending generally horizontally. The center roller is mounted to the other side of the crossbrace by similarly mounted brackets 23, one of which is shown in FIGURE 2.

The crossbrace is fixed at each end to an elongated connector shown generally as 25 which engages one of the wire ropes 26. Each elongated connector has a rope clamp section such as 29 and a body section spaced therefrom which is shown as a generally U-shaped body section 30. The crossbrace is shown fixed to the body section by welds or the like 31. The rope clamp has a curved mounting member 35 which engages the wire rope and an underside clamp 36 pressing against the bottom of the wire rope. The pressing force is provided by a clamping screw 37.

The rope clamp and the U-shaped body member are generally elongated and joined to each other by links such as 38 and 39. Each link is pivotally joined at one end to the curved mounting member by a doubleheaded pin such as 41 which passes through common bore 42 in the link and the curved mounting member. The other end of the link is pivotally connected to the U-shaped member by another double headed pin 43 which passes through a common bore 44 in the link and both arms of the U-shaped member.

A pair of such links are shown joining the rope clamp section to the lower body section. Such links are shown normally skewed towards each other in FIGURE 4. An imaginary line through the center of pins 41 and 43 of link 38 would form an obtuse angle relative to side 46. FIGURE 5 shows the links positioned generally parallel to each other. A line drawn through the center of pins 47 and 48 of link 49 would be parallel to the side 50.

In FIGURE 6, the links are skewed away from each other or a line drawn through the center of pins 53, 54 of link 55 would form an acute angle relative to side 56.

In all of the foregoing embodiments, it is seen that the lower body section may move downstream or move relative to the rope clamp section engaging the wire rope.

The use and operation of my invention are as follows:
Sideframe wire rope conveyors have a number of troughing idler assemblies suspended between the wire ropes. The rollers of the troughing assembly carry the conveying reach of an endless belt, and various loads on such conveying reach place an impact on the assemblies along the conveyor. It is desirable to have these troughing idler assemblies yield with the impact so that undue strain, and consequent damage, is not placed on the conveyor system.

A yielding troughing idler assembly is provided by having elongated connectors which yield with the impact. Such connectors have been shown as having an upper rope clamp section 29 and a lower movable section 30 spaced from the rope clamp section. The body section is movable relative to the rope clamp section which engages spaced wire ropes such as 26. The body section is movably joined to the rope clamp section by linkage means which preferably take the form of a pair of links such as 38, 39. Each of these links may be pivotally connected at one end to the rope clamp by means such as a double headed pin 41 and the other end of the link may be pivotally connected to the body section by another double headed pin such as 43. A plurality of links are required because the connector is elongated. Such a linkage connection permits the body section to move relative to the rope clamp section, or to move downstream when an iimpact hits the troughing idler assembly.

The impact on the troughing idler assembly is transmitted to the elongated connectors because the idler rollers 10, 11 and 12 are mounted on a crossbrace 18 which extends to a pair of spaced elongated connectors. The opposed ends of the crossbrace are fixed by welds or other suitable means to the inner face of the body section. The rollers may be mounted on the crossbrace in a variety of ways and configurations, and suitable brackets such as 20 and 22 have been shown with one of their ends fixed to the crossbrace and other ends holding the ends of a shaft such as 19 around which the roller rotates.

The magnitude of downstream movement of the body section need not be great to relieve the strain on the assembly from the overlying impact. The actual displacement may be substantially less than the dimension of the link joining the movable body section to the stationary rope clamp. Two links have been shown as a preferable embodiment, but a greater number of links could be used to assure sufficient structural support for extraordinary loads. The link arms may be positioned along straight lines so that they are parallel to each other or so an imaginary straight line drawn through the middle of the pivotal pins at opposed ends is parallel to the side 50 of the body section. The link arms may also be skewed towards each other or be in such a position that an imaginary line drawn through the middle of the pins at the opposed ends forms an obtuse angle relative to the side proximate to each link arm, such as side 46 and link 38. This is shown in FIGURE 4. The link arms may also be positioned so they are skewed away from each other, or an imaginary line drawn through the middle of their pins at the opposed ends forms an acute angle relative to the side proximate to each link arm, such as side 56 and link 55. This is shown in FIGURE 6.

The foregoing embodiments, as well as others, will permit the lower body section to make a downstream movement of small magnitude when an impact hits the troughing idler assembly which is mounted on means responsively connected to the movable body section.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. Structure for movably connecting the end of a troughing idler assembly which is subjected to impact loads to the sideframes of a conveyor, said structure including, in combination, a plurality of vertically disposed link members, each of said link members being arranged to swing in a plane parallel to the longitudinal axis of the conveyor, said link members being horizontally spaced in the direction of the longitudinal axis of the conveyor, lower pivotal horizontally axised connecting means arranged to connect each link member, at its lower end portion, to the troughing idler assembly, upper pivotal horizontally axised connecting means arranged to connect each link member, at its upper end portion, to sideframe securement means said link members being swingable about an end portion thereof to enable the troughing idler assembly connected thereto to move in response to the imposition thereon of impact loads.

2. The structure of claim 1 further characterized in that the link members are symmetrically arranged about a centerline.

3. The structure of claim 2 further characterized in that the link members are inclined toward one another.

4. A conveyor idler assembly especially adapted to absorb impact loads, said idler assembly including, in combination, a plurality of generally serially disposed idler rollers, and structure for movably connecting each end of the idler assembly to an associated conveyor sideframe, said structure including, in combination, a plurality of vertically disposed link members, each of said link members being arranged to swing in a plane parallel to the longitudinal axis of the conveyor, said link members being horizontally spaced in the direction of the longitudinal axis of the conveyor, lower pivotal horizontally axised connecting means arranged to connect each link member, at its lower end portion, to the idler assembly, upper pivotal horizontally axised connecting means arranged to connect each link member, at its upper end portion, to sideframe securement means said link members being swingable about an end portion thereof to enable the idler assembly connected thereto to move in response to the imposition thereon of impact loads.

5. The conveyor idler assembly of claim 4 further including a frame structure which maintains the idler rollers in a fixed position with respect to one another.

References Cited by the Examiner

UNITED STATES PATENTS

| | | | |
|---|---|---|---|
| 2,109,925 | 3/1938 | Mitchell | 198—192 X |
| 2,904,166 | 9/1959 | Stinson | 198—202 |
| 2,971,234 | 2/1961 | Hagenbook | |
| 3,075,631 | 1/1963 | Arndt et al. | 198—202 X |

SAMUEL F. COLEMAN, *Primary Examiner.*

WILLIAM B. LABORDE, *Examiner.*